W. V. TURNER.
BOOSTER VALVE FOR AIR BRAKES.
APPLICATION FILED JULY 3, 1915.
1,221,926.
Patented Apr. 10, 1917.
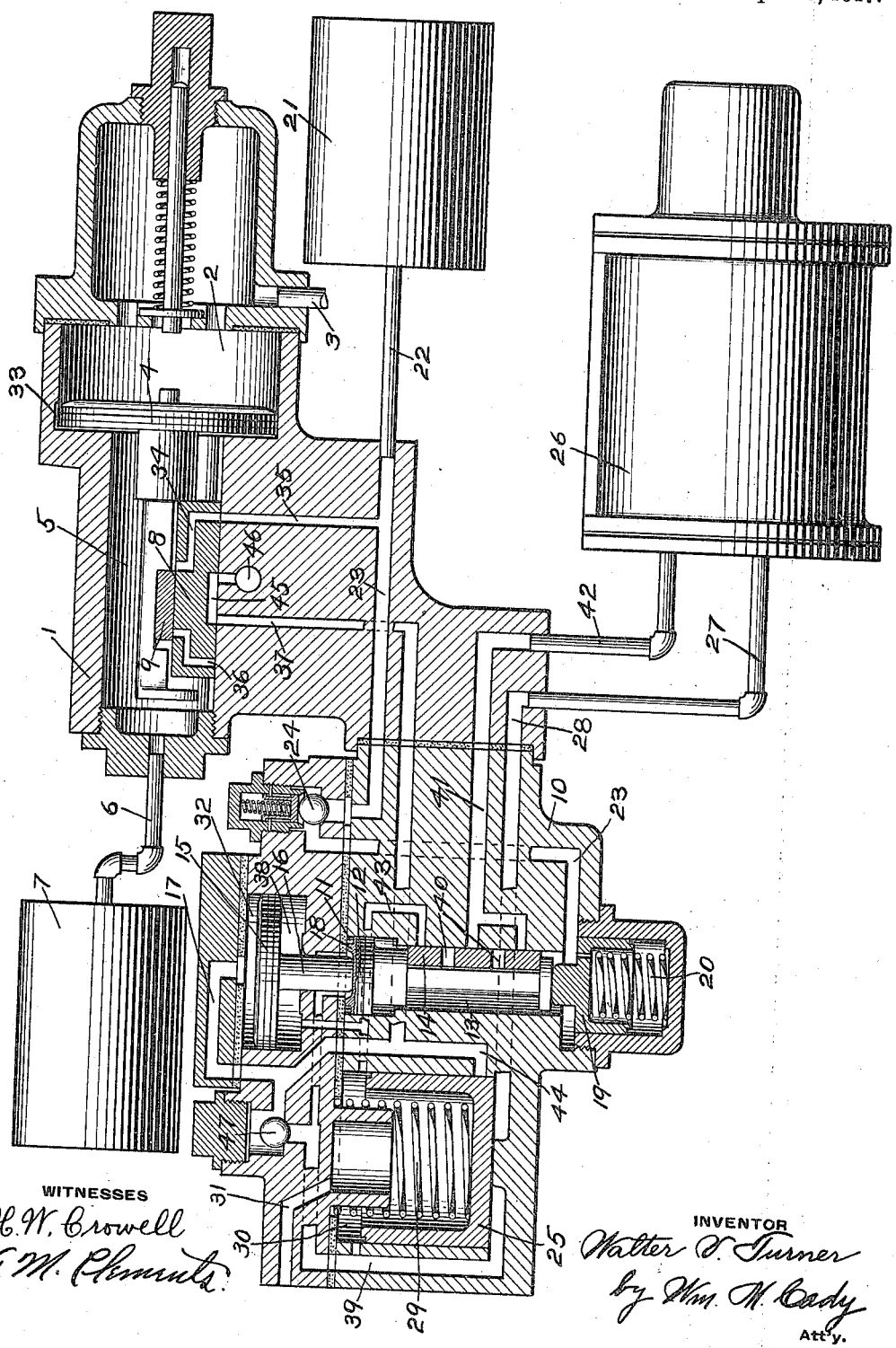
WITNESSES
H. W. Crowell
G. M. Clements
INVENTOR
Walter V. Turner
by Wm. W. Cody
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BOOSTER-VALVE FOR AIR-BRAKES.

1,221,926.

Specification of Letters Patent.  Patented Apr. 10, 1917.

Application filed July 3, 1915.  Serial No. 37,892.

*To all whom it may concern:*

Be it known that I, WALTER V. TURNER, a citizen of the United States, residing at Edgewood, in the county of Allegheny and State of Pennsylvania, have invented new and useful Improvements in Booster-Valves for Air-Brakes, of which the following is a specification.

This invention relates to fluid pressure brakes, and more particularly to a brake apparatus for controlling the application and release of the brakes.

For a given travel of the brake cylinder piston and with a predetermined auxiliary reservoir volume, the brake cylinder pressure obtained for a given reduction in brake pipe pressure will be fixed and if the brake cylinder volume be increased either by a direct increase in cylinder volume or indirectly as by the addition of piping or the like, then under the above conditions, the brake cylinder pressure will be correspondingly less.

An increase in brake cylinder volume may be compensated for by employing a larger auxiliary reservoir volume or by reducing the piston travel, but it is sometimes undesirable to accomplish the result in this manner.

The principal object of my invention is to provide means for obtaining a desired brake cylinder pressure for a given reduction in brake pipe pressure regardless of the brake cylinder volume and without increasing the auxiliary reservoir volume or reducing the brake cylinder piston travel.

In the accompanying drawing, the single figure illustrates a fluid pressure brake apparatus in section, with my improvement embodied therein.

My invention may be applied to various types of brake controlling valve devices and in the drawing as shown in connection with an ordinary triple valve device comprising a casing 1 having a piston chamber 2 connected to brake pipe 3 and containing piston 4.

Valve chamber 5 at one side of piston 4 is connected by pipe 6 to auxiliary reservoir 7 and contains the usual main slide valve 8 and graduating valve 9 adapted to be operated by piston 4.

The valve device for boosting the pressure in the brake cylinder may comprise a casing 10 adapted to be secured to the triple valve casing 1 and having a piston chamber 11 containing a piston 12 and a valve chamber 13 containing a slide valve 14 adapted to be operated by the piston 12. A second enlarged piston 15 is provided with a stem 16 adapted to engage the piston 12, and has a chamber 32 at one side, which communicates with a passage 17.

The piston 12 is provided with a seat 18 and is normally held in the seated position by a spring stop 19, subject to the pressure of a spring 20.

The valve chamber 13 is open to a supplemental reservoir 21 through pipe 22 and passage 23 containing a non-return ball check valve 24.

The booster valve casing 10 also contains a valve piston 25 subject on one side to brake cylinder pressure supplied from the brake cylinder 26 through pipe 27 and passage 28 and on the opposite side to the pressure of a spring 29, the spring chamber 30 being open to the atmosphere through a passage 31.

In operation, fluid supplied to the brake pipe 3 flows to piston chamber 2 and through the usual feed groove 33 to valve chamber 5, charging the auxiliary reservoir 7. The supplemental reservoir 21 is charged from valve chamber 5 through a port 34 in the slide valve 8 which registers in release position of the valve with a passage 35, opening into passage 23.

Fluid is then supplied from the supplemental reservoir 21 through passage 23 to valve chamber 13.

If the brake pipe pressure is reduced to effect an application of the brakes, the triple valve parts move out, so that service port 36 registers with passage 37 which opens into passage 17.

Fluid from the auxiliary reservoir 7 will then be admitted to the piston chamber 32. Chamber 38 at the opposite side of piston 15 is subject to the fluid at brake cylinder pressure supplied through passages 28 and 39, the stem 16 being a loose fit in its guide bearing, and since the brake cylinder is now at atmospheric pressure, the piston 15 will be promptly actuated by the auxiliary reservoir pressure, so as to effect the movement of the piston 12 and the slide valve 14. By this movement, ports 40 in the valve 14 are brought into registry with branches of a passage 41 connected by pipe 42 to the brake cylinder 26, so that fluid is supplied from the supplemental reservoir 21 to the brake cylinder.

While fluid is being thus supplied from the supplemental reservoir to the brake cylinder, the usual communication from the auxiliary reservoir to the brake cylinder is cut off by the valve piston 25.

The movement of the slide valve 14 to open the ports for supplying fluid from the supplemental reservoir to the brake cylinder also uncovers a passage 43, leading to spring chamber 30, and having a branch passage leading to the chamber 38 below the piston 15, so that fluid from the supplemental reservoir can flow to said chambers, but since chamber 30 is open to exhaust port 31, the pressure in the chamber 38 can not build up, and the parts will therefore remain in open position.

When the brake cylinder pressure has been increased to a predetermined degree by flow from the supplemental reservoir, the brake cylinder pressure which acts on the underside of the valve piston 25 will overcome the resistance of spring 29 and said valve piston will then be shifted upwardly so as to uncover passage 44 and thus permit flow from the auxiliary reservoir to the brake cylinder through passages 37, 44, and 28. This movement of the valve piston 25 also closes passage 43, so that fluid from the supplemental reservoir can no longer vent at the exhaust port 31. The pressure in the chamber 38 will then build up instantly to supplemental reservoir pressure and since the piston chamber 32 is now open to the brake cylinder, the higher supplemental reservoir pressure operates the piston 15 and permits the spring 20 to return the valve 14 to the closed position, in which the supply of fluid from the supplemental reservoir to the brake cylinder is cut off.

It will thus be seen that in making a service application of the brakes, fluid is first supplied from the supplemental reservoir to the brake cylinder until the brake cylinder pressure has been built up to a predetermined degree, while communication from the auxiliary reservoir to the brake cylinder is cut off, and then the supply from the supplemental reservoir is cut off and communication is opened for supplying fluid from the auxiliary reservoir. Since no fluid is taken from the auxiliary reservoir during the period that fluid is supplied from the supplemental reservoir, the full pressure of the auxiliary reservoir is retained for gradually increasing the brake cylinder pressure in the usual way upon further reductions in brake pipe pressure, so that the usual size auxiliary reservoir may be employed to obtain the desired brake cylinder pressures in spite of any increase in brake cylinder volume due to piping and the like.

In releasing the brakes, upon movement of the triple valve parts to release position, passage 37 will be connected through cavity 45 in slide valve 8 with cavity port 46 and fluid from the brake cylinder will then exhaust through passages 28 and 39, lifting check valve 47. With the release of brake cylinder pressure, the spring 29 operates to return the valve piston 25 to its normal position.

Having now described my invention, what I claim as new and desire to secure by Letters Patent, is:

1. In a fluid pressure brake, the combination with a brake cylinder, auxiliary reservoir, and an additional source of fluid under pressure, of means operating in a service application of the brakes for supplying fluid from said additional source of fluid under pressure to the brake cylinder and adapted upon a predetermined increase in brake cylinder pressure to cut off the supply from the additional source and open communication for supplying fluid from the auxiliary reservoir to the brake cylinder.

2. In a fluid pressure brake, the combination with a brake cylinder, auxiliary reservoir, and an additional source of fluid under pressure, of means operating upon a service application of the brakes for first supplying fluid from the additional source of fluid under pressure to the brake cylinder with communication from the auxiliary reservoir cut off and then adapted upon a predetermined increase in brake cylinder pressure to cut off the supply from the additional source and open communication for supplying fluid from the auxiliary reservoir to the brake cylinder.

3. In a fluid pressure brake, the combination with a brake pipe, brake cylinder, auxiliary reservoir, supplemental reservoir, and a valve device operated upon a gradual reduction in brake pipe pressure for supplying fluid from the auxiliary reservoir to the brake cylinder, of means for first supplying fluid from the supplemental reservoir to the brake cylinder with communication from the auxiliary reservoir to the brake cylinder cut off and then adapted to cut off the supply from the supplemental reservoir to the brake cylinder and open communication for supplying fluid from the auxiliary reservoir to the brake cylinder.

4. In a fluid pressure brake, the combination with an auxiliary reservoir, brake cylinder, and a supplemental reservoir normally charged with fluid under pressure, of a valve mechanism operated by flow of air from the auxiliary reservoir in applying the brakes for opening communication from the supplemental reservoir to the brake cylinder and means operated upon a predetermined increase in brake cylinder pressure for opening communication from the auxiliary reservoir to the brake cylinder and for effecting the operation of said valve mechanism to cut off the supply of fluid from the supplemental reservoir to the brake cylinder.

5. In a fluid pressure brake, the combination with a brake cylinder, auxiliary reservoir, a supplemental reservoir normally charged with fluid under pressure, a brake pipe, and a valve device operated upon a reduction in brake pipe pressure for supplying fluid from the auxiliary reservoir to the brake cylinder, of a valve mechanism operated by the flow of fluid from the auxiliary reservoir in applying the brakes for opening communication from the supplemental reservoir to the brake cylinder and means normally closing communication from the auxiliary reservoir to the brake cylinder and operated upon a predetermined increase in brake cylinder pressure for opening said communication and for varying the fluid pressure on said valve mechanism to operate same and thereby cut off communication from the supplemental reservoir to the brake cylinder.

In testimony whereof I have hereunto set my hand.

WALTER V. TURNER.

Witnesses:
A. M. CLEMENTS,
BARBARA HERBERT.

Copies of this patent may be obtained for five cents each, by addressing the "Commissioner of Patents, Washington, D. C."